(12) United States Patent
McCulloch

(10) Patent No.: US 6,423,927 B1
(45) Date of Patent: Jul. 23, 2002

(54) LASER SYSTEM

(75) Inventor: David J. McCulloch, Redhill (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 134 days.

(21) Appl. No.: 09/643,486

(22) Filed: Aug. 22, 2000

(30) Foreign Application Priority Data

Sep. 24, 1999 (GB) ............................................. 9922576

(51) Int. Cl.⁷ .............................................. B23K 26/00
(52) U.S. Cl. .............................. 219/121.66; 219/121.73
(58) Field of Search ....................... 219/121.61, 121.62, 219/121.65, 121.66, 121.73

(56) References Cited

U.S. PATENT DOCUMENTS

| | | | | |
|---|---|---|---|---|
| 5,756,364 A | * | 5/1998 | Tanaka et al. | 437/21 |
| 5,815,494 A | * | 9/1998 | Yamazaki et al. | 372/25 |
| 6,242,292 B1 | * | 6/2001 | Yamazaki et al. | 372/25 |

FOREIGN PATENT DOCUMENTS

JP  11214324 A  8/1999

* cited by examiner

*Primary Examiner*—Samuel M. Heinrich
(74) *Attorney, Agent, or Firm*—Aaron Waxler

(57) ABSTRACT

A laser system (1) for producing a line beam laser output (4) comprises a laser source (6), and a lens system (12) for modifying the intensity profile of the incident laser input, and comprising a plurality of lens elements (16) arranged at a predetermined lens pitch. An optical filter (9) is provided between the laser source (6) and the lens system (12), the filter comprising transmissive portions (42) and opaque portions (44). The transmissive portions (42) define a repeating pattern (46) with a pitch corresponding to the lens pitch. The optical filter (9) modifies the input to the lens system (12) such that the output of the lens system gives rise to a desired intensity profile at the output of the laser system (1). This desired profile can have a tapered profile at the top of the hat, which gives improved performance for laser crystallization. The invention can be implemented with minimum adaptation of an existing top hat profile laser system.

12 Claims, 3 Drawing Sheets

LASER SYSTEM

This invention relates to laser systems, particularly but not exclusively for providing output profiles suitable for laser crystallisation of semiconductor films, such as crystallisation of amorphous silicon to form polycrystalline silicon in thin film devices. The invention also relates to apparatus and methods for crystallising a semiconductor film using such a laser system.

SUMMARY OF THE INVENTION

It is well known that the use of laser crystallisation processes can enable the manufacture of low-temperature poly-silicon devices, for example for displays or other circuits. However, the laser crystallisation process can give rise to poor yields, resulting from poor uniformity of the laser crystallisation process.

One factor contributing to this poor uniformity is the use of a simple so-called top-hat beam profile. This profile has a substantially constant intensity over the width of the profile. Thus, when an amorphous silicon film is crystallised by scanning this beam across it, the amorphous silicon film is exposed to a substantially constant intensity. This intensity must fall within a very narrow range for the crystallisation process to be successful. This is because it is required that nearly all of the film is melted during the crystallisation process, and there should be no full melt-through of the amorphous silicon layer. During cooling, a portion of the layer which has experienced full melt-through will recrystallise into a fine-grained structure giving rise to reduced quality in the final product. The intensity may exceed the maximum value and thereby achieve full melt-through as a result of jitter in the output from the laser source.

Because the laser output is scanned across the sample being treated, an individual laser pulse which exceeds the maximum desired intensity will be the first laser shot applied to some areas of the substrate, but will be the last laser shot applied to other areas. The region of the substrate for which that pulse was the last shot will maintain this fine-grained structure since no further laser heating is carried out.

According to the invention, there is provided a laser system for producing a two dimensional laser output comprising: a laser source producing a two dimensional output having a first intensity profile across the two dimensional area; a lens system for modifying the intensity profile of an incident laser input and comprising a plurality of lens elements arranged at a predetermined lens pitch, the system being characterised in that an optical filter is provided between the laser source and the lens system, the filter comprising transmissive portions and opaque portions, the transmissive portions defining a repeating pattern with a pitch corresponding to the lens pitch, the optical filter modifying the input to the lens system such that the output of the lens system gives rise to a desired intensity profile at the output of the laser system.

The optical filter in the laser system of the invention enables the output from the laser source to be modified so that the output of the laser system, even with a conventional lens system for producing a top-hat profile, has a modified output for subsequent laser crystallisation.

The modification to the output of the laser system may be selected to alter the intensity profile of the output across its width. For example, the lens system may be designed to modify the first intensity profile to produce a top-hat intensity profile having a substantially constant intensity over a substantial part of the width of the profile, and the optical filter is arranged such that the output of the lens system has a tapered intensity profile over part of the width of the profile.

Alternatively, the modification to the output of the laser system may be selected to vary the shape of the output beam. For example, the lens system may be designed to reduce the width and increase the length of the first intensity profile to produce a line beam, and the optical filter may then be arranged to enable a discontinuous line beam output.

The optical filter may comprise a plate having an opening or openings, or it may comprise a patterned dielectric layer or layers provided over a substrate.

Preferably, the laser source comprises a pulsed laser source, having a semi-Gaussian profile.

The invention also provides laser crystallisation apparatus comprising a laser system of the invention and means for scanning the width of the desired intensity profile across the surface of the sample for laser treatment. The scanning may be achieved by providing the sample on a movable support.

BRIEF DESCRIPTION OF THE DRAWINGS

Embodiments of the invention will now be described, by way of example, with reference to and as shown in the accompanying drawings in which.

DESCRIPTION OF THE PREFERRED EMBODIMENTS

Figure 1:
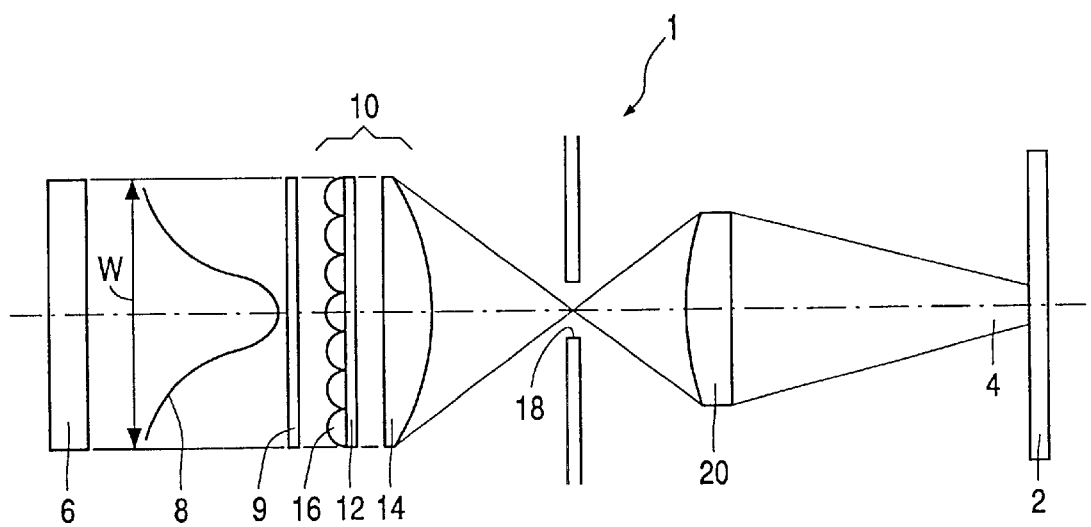
FIG. 1 shows an apparatus comprising a laser system for producing a top-hat intensity profile but modified with an optical filter of the invention.

FIG. 1 shows an apparatus comprising a known laser system for producing a two-dimensional laser output suitable for crystallisation of a semiconductor sample, but with the inclusion of an optical filter to form a system in accordance with the invention. The known parts of the system will first be described. The system 1 is for radiation of a sample 2 with a line beam 4 having a controlled intensity profile. Typically, the sample 2 comprises a silicon film on an insulating substrate. The line beam 4 is scanned across the surface of the sample 2, and this is achieved by mounting the sample 2 on a movable support (not shown).

The laser system comprises a laser source 6 which may have a semi-Gaussian intensity profile. The output of the laser source is a two-dimensional light front and on one dimension the intensity varies following a normal distribution, as represented by curve 8, whereas the intensity is constant following the other dimension. The width of the beam W may be approximately 20 mm, and the depth (into or out of the page in relation to FIG. 1) may have a similar dimension.

For laser crystallisation a line beam is desired having a narrow width, for example 0.5 mm, but a much greater length to span across the entire substrate of the semiconductor film. Also, it is desirable to modify the normal intensity profile shown as 8.

In order to reshape and modify the intensity of the light signal, a homogeniser 10 is provided which comprises a first array of lenses 12 and a focusing lens 14. A single array of lenses 12 is represented in FIG. 1 but there will in fact be multiple arrays, as will be apparent from the following. The individual lenses are cylindrical lenses 16 and the effect of the optical system is to combine different sections of the intensity profile of the laser source 6 so as to produce a more uniform laser intensity across the width of the profile. The function of the first lens array 12 is therefore to alter the intensity profile of the laser beam across its width. A further array of lenses is also provided, although not shown in FIG. 1, for altering the shape of the laser output. This further array of lenses comprises a perpendicular lens array and which may be arranged to alter the intensity profile in the long axis of the laser output, in order to reshape the area of coverage of the laser output to provide the line beam 4 required.

The focusing lens 14 focuses the signals to an aperture 18 and a projection lens 20 finally images the reshaped laser output on to the sample 2. The focusing aperture 18 sharpens the edge of the line beam, and indeed the width of the aperture 18 may be adjustable to provide different line beam widths.

To the extent described above, the operation of the laser system described with reference to FIG. 1 is known. In particular, existing commercially available systems have specific optical designs to enable the conversion from a semi-Gaussian intensity profile output from a laser source 6 to a so-called top-hat intensity profile. These intensity profiles will now be described with reference to FIGS. 2 and 3.

Figure 2A:
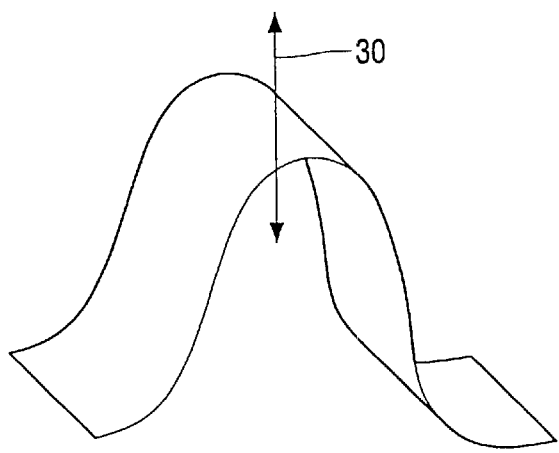
FIG. 2 shows the Gaussian intensity profile of the laser source and the top-hat profile of the unmodified system output.
Figure 2B:
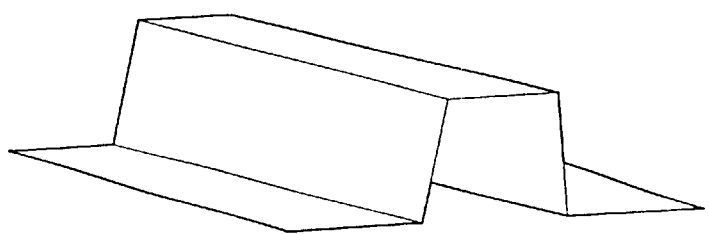

FIG. 2A represents schematically, in two-dimensions, a semi-Gaussian output profile of the laser source 6. This intensity profile is not totally constant over time, and so-called jitter in the fluence occurs even in state-of-the-art lasers. The most significant type of jitter for the following discussions is so-called fluence jitter represented by arrow 30. The result of fluence jitter is that the peak intensity of the laser is not constant and can rise or fall within certain tolerances unpredictably. FIG. 2B shows the desired top-hat intensity profile conventionally used in laser crystallisation apparatus. As represented schematically, the profile has a substantially constant intensity over the main width of the profile, and the length of the beam is greatly increased with respect to the output of the laser source 6.

Figure 3:
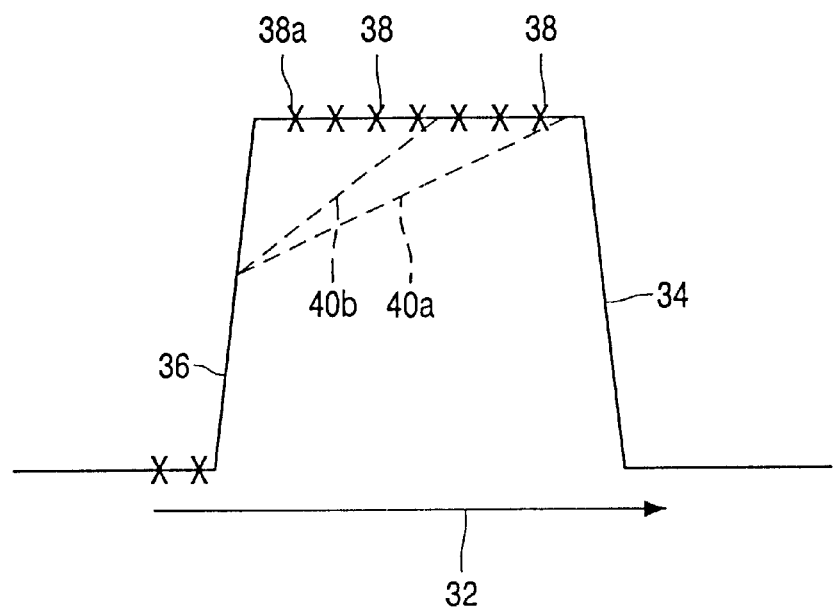
FIG. 3 shows the top-hat profile at the output of the system of FIG. 1 when not modified, and also shows alternative desired outputs.

FIG. 3 shows in greater detail the top-hat intensity profile. Line 32 represents the scan direction of the beam across the surface of the sample. Thus, the edge 34 represents a leading edge of the intensity profile, and the edge 36 represents a trailing edge. During laser crystallisation, the laser source 6 is pulsed during the relative movement between the laser output and the sample 2. Consequently, the sample is subjected to a number of shots of laser irradiation, represented by crosses 38 in FIG. 3. With the number of shots illustrated in FIG. 3, each area of the sample is subjected to seven laser shots at a substantially constant intensity along the top of the top-hat profile. The overall width of the top-hat profile may be around 500 μm, and although the leading and trailing edges are intended to be vertical, they may typically occupy a width of around 50 μm.

A problem with the use of the top-hat profile has been recognised in the past, that the profile does not tolerate much fluence jitter as represented in FIG. 2A. This is because the intensity at the constant part of the top-hat profile is highly critical. In the case of laser crystallisation of amorphous silicon to form polycrystalline silicon, the energy provided by the laser crystallisation process is required to melt the amorphous silicon film across almost its full depth (thickness). However, a full melt of the amorphous silicon layer is to be avoided, as the subsequent cooling gives rise to a fine crystalline structure. The laser crystallisation is intended to provide the largest possible grain size, and this is achieved by approaching as closely as possible a full melt, but without actually achieving that full melt. Thus, to achieve the largest grain size the intensity of the top-hat profile must be selected as close as possible to the maximum level. Any fluence jitter in the output of the laser source 6 will translate to a fluctuation in the profile of FIG. 3. An increase in intensity in the top-hat profile will be particularly severe for those areas of the sample receiving their final laser shot from that particular pulse of the laser source 6. This is shot 38*a* in FIG. 3. For these areas of the sample, recrystallisation will form a fine-grained structure, and there will be no further laser shots to remedy this situation.

An improved laser intensity profile introduces a downward gradient 40 (two alternatives 40*a*, 40*b* are represented in FIG. 3) in the fluence towards the trailing edge.

This ensures that all areas of the sample are subjected to the desired number of shots, so that there is sufficient energy for large grain growth throughout the sample area, but the final shots applied to each area of the sample do not have sufficient energy for full melt through, even if there is fluence jitter in the output of the laser source 6.

In accordance with the invention, this modified top-hat profile is achieved by inserting an optical filter 9 between the laser source 6 and the homogeniser 10, as shown schematically in FIG. 1.

Figure 4:
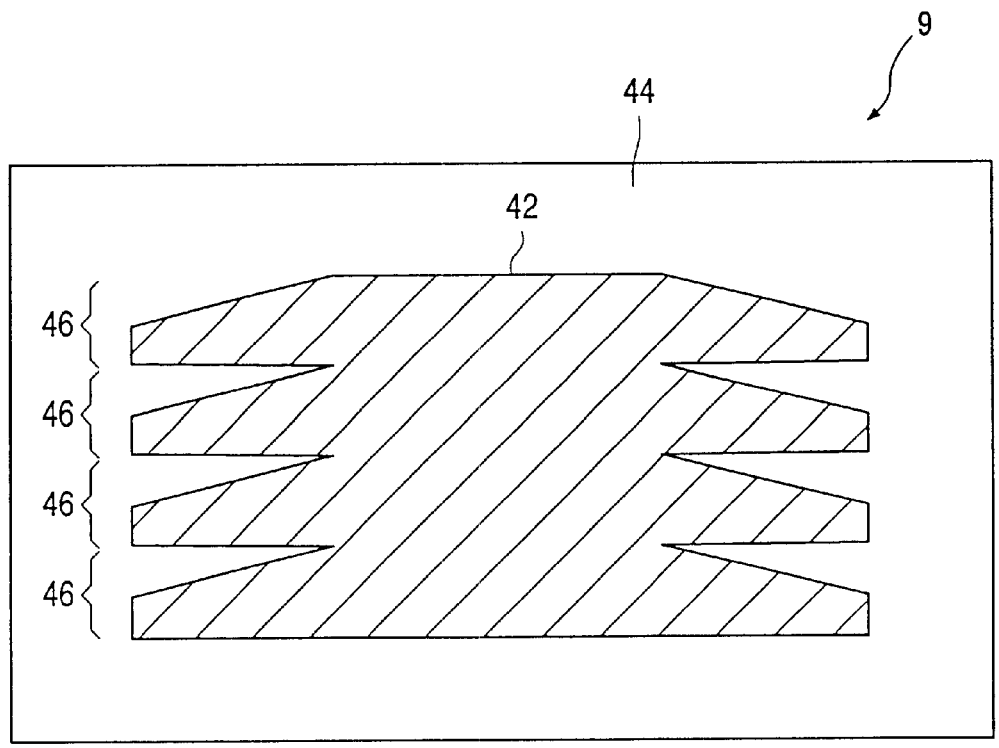
FIG. 4 shows a first example of an optical filter for use in the apparatus of FIG. 1 in accordance with the invention.

One example of optical filter is shown in FIG. 4, and comprises transmissive portions (the hatched area 42) and opaque portions (the remainder 44 of the filter). The optical filter may comprise a solid plate or foil patterned with a hole or an array of holes. Alternatively, the filter may comprise a transmissive substrate, for example quartz, with suitable anti-reflection layers and patterned dielectric layers for varying the optical transmission. These dielectric layers may be deposited by chemical vapour deposition techniques, or by evaporation, and may then be patterned using conventional photolithographic techniques. The optical filter shown in FIG. 4 comprises a repeating pattern 46. The example of FIG. 4 is intended to modify the intensity profile across the width of the beam, for example to provide the modified top-hat profile referenced as 40*b* in FIG. 3. For this purpose, the pitch of the repeating pattern 46 corresponds to the pitch of the individual lenses 16 in the lens array 12 of the homogeniser 10 provided for modifying the intensity profile across the width of the beam. Although only four repeating portions 46 are shown in FIG. 4, there will in fact be a number of repetitions corresponding to the number of lens elements 16 in the lens array 12. Each individual pattern 46 is designed to alter the light input to the homogeniser 10 so that the output no longer follows the pre-set top-hat profile, but instead follows the modified profile as shown in FIG. 3. Therefore, the use of existing top-hat profile lens systems can be employed, with minimum adaptation to enable control of the output profile of the complete laser system.

Figure 5:
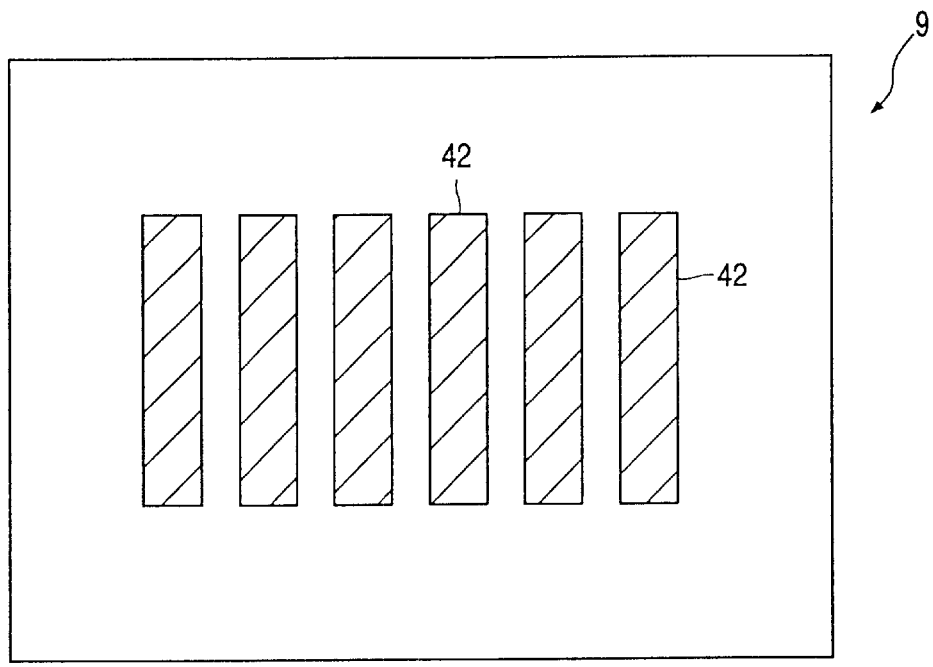
FIG. 5 shows a second example of optical filter for use in the apparatus of FIG. 1.

The invention also enables an optical filter to be provided to alter the shape of the output of the laser system. For example, a discontinuous line beam 4 may be desired so that certain areas of the sample being treated are not exposed to laser irradiation. The line beam length is modified by the second, perpendicular array of lens elements, not shown in FIG. 1. In this case the optical filter will have a repeating pattern perpendicular to that shown in FIG. 4, and with a pitch corresponding to the lens pitch of this second array of lenses. An example is given in FIG. 5, in which the transmissive portions 42 comprise individual slots, each of which is intended for an individual lens element. The opaque part between slots 42 effectively blocks out a portion of the line beam 4 so that a selected area of the sample may be treated.

Figure 6:
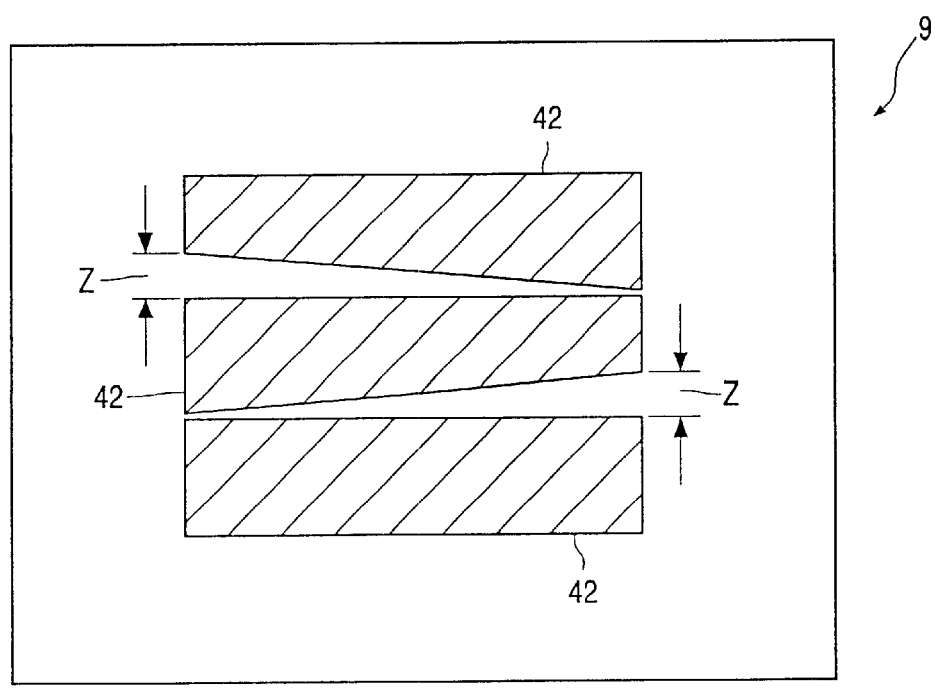
FIG. 6 shows a third example of optical filter for use in the apparatus of FIG. 1.

FIG. 6 shows a possible optical filter design which takes into account both lens arrays of the homogeniser 10, to produce the profile 40a or 40b of FIG. 3 and to improve the consistency of this profile along the long axis of the beam. As the width Z is increased, so the profile changes from 40b towards 40a.

In each case described above, the optical filter must be aligned accurately with the homogeniser, since the repeating pattern of the optical filter is designed having regard to the lens systems used in the homogeniser. In the case that a metal sheet is used with transmissive openings, a low expansion alloy is preferred so as to avoid distortion during laser machining of the openings.

From reading the present disclosure, other variations and modifications will be apparent to persons skilled in the art. Such variations and modifications may involve equivalents and other features which are already known in the design, manufacture and use of laser systems and of laser crystallisation apparatus and which may be used of or in addition to features already described herein.

Although Claims have been formulated in this Application to particular combinations of features it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

The applicants hereby give notice that new claims may be formulated to any such features and/or combinations of such features during the prosecution of the present application or any further application derived therefrom.

What is claimed is:

1. A laser system for producing a two dimensional laser output comprising:
   a laser source producing a two dimensional output having a first intensity profile across the two dimensional area;
   a lens system for modifying the intensity profile of an incident laser input and comprising a plurality of lens elements arranged at a predetermined lens pitch, characterised in that an optical filter is provided between the laser source and the lens system, the filter comprising transmissive portions and opaque portions, the transmissive portions defining a repeating pattern with a pitch corresponding to the lens pitch, the optical filter modifying the input to the lens system such that the output of the lens system gives rise to a desired intensity profile at the output of the laser system.

2. A system as claimed in claim 1, wherein the optical filter comprises a plate having an opening or openings.

3. A system as claimed in claim 1, wherein the optical filter comprises a patterned dielectric layer or layers provided over a substrate.

4. A system as claimed in claim 3, wherein the substrate comprises a quartz substrate.

5. A system as claimed in claim 1, wherein the laser source comprises a pulsed laser source.

6. A system as claimed in claim 1, wherein the first intensity profile comprises a semi-Gaussian profile.

7. A system as claimed in claim 1, wherein the lens system is designed to modify the first intensity profile to produce a top-hat intensity profile having a substantially constant intensity over a substantial part of the width of the profile, and wherein the optical filter is arranged such that the output of the lens system has a tapered intensity profile over part of the width of the profile.

8. A system as claimed in any one of claim 1, wherein the lens system is designed to reduce the width and increase the length of the first intensity profile to produce a line beam, and wherein the optical filter is arranged to enable a discontinuous line beam output.

9. A system as claimed in claim 1, further comprising a focus lens at the output of the lens system, a focusing aperture at the output of the focus lens, and a projection lens at the output of the focusing aperture.

10. Laser apparatus comprising a laser system as claimed in claim 1, and means for scanning the width of the desired intensity profile across the surface of a sample for laser treatment.

11. Apparatus as claimed in claim 10, wherein the means for scanning comprises a movable support for supporting the sample.

12. In the manufacture of a thin-film device, a method of crystallising a semiconductor film in laser apparatus as claimed in claim 1, wherein the laser beam with the said desired intensity profile is scanned across the semiconductor film to melt the film across a part of its thickness.

* * * * *